No. 811,564. PATENTED FEB. 6, 1906.
J. P. JACKSON.
ATTACHMENT TO SPECTACLES.
APPLICATION FILED OCT. 31, 1904.

Witnesses

John P. Jackson,
Inventor.
by C. A. Snow & Co.
Attorneys

UNITED STATES PATENT OFFICE.

JOHN PLUMMER JACKSON, OF ORLEANS, INDIANA.

ATTACHMENT TO SPECTACLES.

No. 811,564.  Specification of Letters Patent.  Patented Feb. 6, 1906.

Application filed October 31, 1904. Serial No. 230,883.

*To all whom it may concern:*

Be it known that I, JOHN PLUMMER JACKSON, a citizen of the United States, residing at Orleans, in the county of Orange and State of Indiana, have invented a new and useful Attachment to Spectacles, of which the following is a specification.

This invention relates to spectacles, and especially to that class of eyeglasses or spectacles known as "grab-fronts."

A further object of the invention is to provide a device of this character in which the supplemental lenses are arranged in a frame that may be readily attached to the ordinary eyeglass or spectacle frame without danger of scratching or otherwise injuring either set of lenses.

A still further object of the invention is to provide a grab-front attachment in which the supplemental lenses will be held outward at an acute angle to the plane of the main lenses in a position most favorable for use.

A still further object of the invention is to provide a grab-front frame that may be readily bent to assume any desired shape for attaching to spectacles or eyeglasses of any size.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 1:
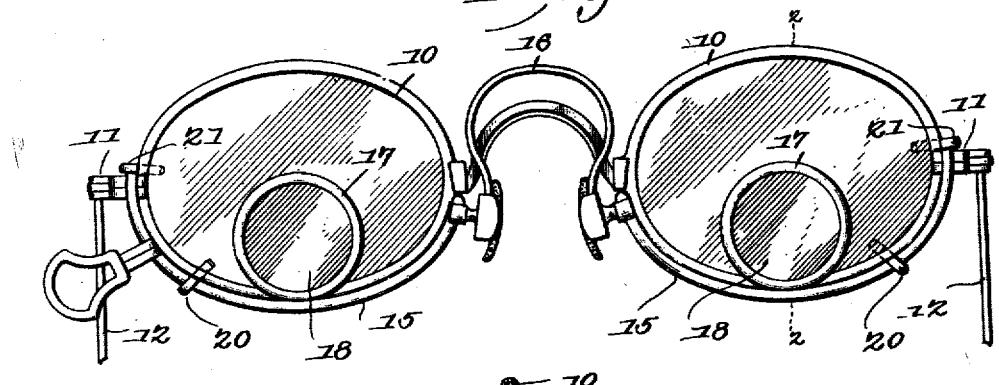
Figure 2:
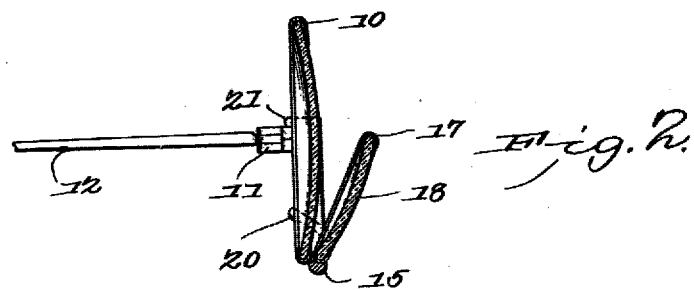
Figure 3:
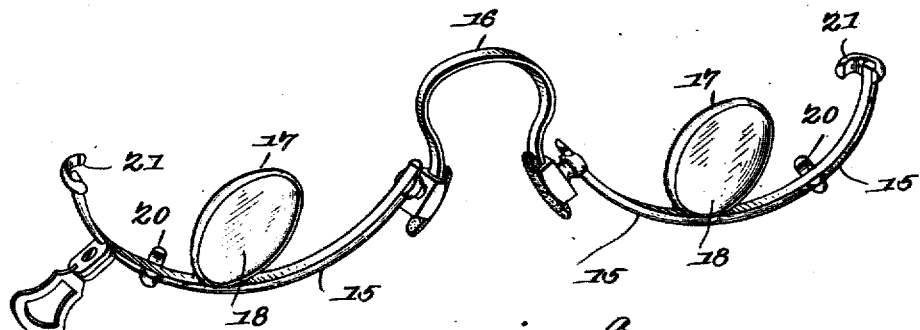

In the accompanying drawings, Figure 1 is a face view of a pair of spectacles provided with a grab-front in accordance with the invention. Fig. 2 is a transverse sectional view of the same on the line 2 2 of Fig. 1. Fig. 3 is a detail perspective view of the grab-front detached.

Similar numerals of reference are employed to indicate corresponding parts throughout the several figures of the drawings.

The pair of spectacles 10 may be of any desired construction, those shown in the present instance being provided with the usual end lugs 11, arranged for pivotal connection to the temples or bows 12.

The frame of the grab-front is formed of two curved strips 15, that are connected by a bowed spring 16, and to each of the strips 15 is secured an annular frame 17 for the reception of the supplemental lenses 18. Each of the strips 15 is formed of metal that may be bent in order to conform to the contour of the frames of the main lenses, and the connection between the spring and the strips 15 is of a type usually found in eyeglasses and the like, the ends of the spring tending normally to move toward each other, and thus draw the strips 15 in opposite directions, respectively. The supplemental frame is provided with nose-guards 19 in the form of small blocks or strips that are secured to the ends of the spring, these guards pressing against the nose of the wearer and forming an auxiliary holding means, so that the attachment is not wholly dependent on the spectacle-frame for its support.

To each of the spring arms or strips 15 is secured a pair of clips 20 21, that are extended rearwardly and engage with the frame of the spectacles, the end clips 21 being disposed immediately above and resting upon the end lugs 11 of said frame, while the clips 20 engage against the rear portion of the frame at a point adjacent to the supplemental lenses.

When the attachment has been adjusted to the spectacle-frame, the supplementel lenses are extended out at an acute angle to the plane of the main lenses, as shown more clearly in Fig. 2, so that reflected light-rays from the object being examined cannot enter the eye. The frames are of such nature, moreover, that the lenses cannot come into contact with each other nor can the frame of one lens engage the lens carried by the opposite frame, so that accidental scratching of the lenses is avoided.

Having thus described the invention, what is claimed is—

1. In an attachment for spectacles and the like, a frame including a pair of strips curved to follow the general contour of the lower portions of a spectacle-frame, a nose-engaging spring connecting said strips and tending to draw them toward each other, clips carried by the strips and adapted to engage the frame of the spectacles, and auxiliary lenses carried by said strips and disposed at an angle to the general plane to which the strips and spring are arranged.

2. In an attachment for spectacles and the like, a frame including a pair of curved strips, a spring connecting said strips and tending to draw the same toward each other, nose-guards secured to the spring, auxiliary lens-supporting frames secured at their lower edges to the strips at points near the ends of the latter, lenses in said supporting-frames, and spring-clips carried by said curved strips and adapted to engage the frame of the main glasses.

In testimony that I claim the foregoing as my own I have hereto affixed my signature in the presence of two witnesses.

JOHN PLUMMER JACKSON.

Witnesses:
HENRY REED,
CHARLES P. COLLINS.